United States Patent
Koyama et al.

(10) Patent No.: US 7,890,621 B2
(45) Date of Patent: Feb. 15, 2011

(54) INFORMATION PROCESSING SYSTEM, HOST DEVICE, AND PROGRAM FOR CAUSING COMPUTER TO EXECUTE INFORMATION PROCESSING METHOD INCLUDING COMMUNICATION COMPLETION JUDGING

(75) Inventors: Fumio Koyama, Hara-mura (JP); Yasuhito Nagatomo, Shiojiri (JP); Atsushi Narusawa, Hino (JP)

(73) Assignee: Seiko Epson Corporation (JP)

( * ) Notice: Subject to any disclaimer, the term of this patent is extended or adjusted under 35 U.S.C. 154(b) by 716 days.

(21) Appl. No.: 11/689,680

(22) Filed: Mar. 22, 2007

(65) Prior Publication Data

US 2008/0040422 A1 Feb. 14, 2008

(30) Foreign Application Priority Data

Mar. 23, 2006 (JP) .............................. 2006-080370

(51) Int. Cl.
*G06F 15/16* (2006.01)
*G06F 15/173* (2006.01)
*G06F 15/177* (2006.01)

(52) U.S. Cl. .......................... 709/224; 709/203; 345/52; 705/39

(58) Field of Classification Search ......... 709/217–228, 709/203; 705/39; 345/52
See application file for complete search history.

(56) References Cited

U.S. PATENT DOCUMENTS 7,606,762 B1* 10/2009 Heit ............................ 705/39

| 2004/0174981 | A1 | 9/2004 | Ushida | |
| 2005/0086612 | A1* | 4/2005 | Gettman et al. | 715/848 |
| 2005/0257127 | A1* | 11/2005 | Tanaka et al. | 715/500 |
| 2006/0029250 | A1* | 2/2006 | Karaki | 382/100 |
| 2007/0268207 | A1* | 11/2007 | Karaki | 345/52 |
| 2007/0285347 | A1* | 12/2007 | Karaki | 345/30 |

FOREIGN PATENT DOCUMENTS

| JP | 11-250357 | 9/1999 |
| JP | 2003-157184 | 5/2003 |
| JP | 2004-289803 | 10/2004 |
| JP | 2004-303029 | 10/2004 |
| JP | 2005-099460 | 4/2005 |
| JP | 2005-181436 | 7/2005 |

* cited by examiner

*Primary Examiner*—Haresh N Patel
(74) *Attorney, Agent, or Firm*—Harness, Dickey & Pierce, P.L.C.

(57) ABSTRACT

An information processing system including a host device and a client device which requests the host device to process information, includes: a communication unit which provides communication between the host device and the client device, wherein the host device includes: a communication completion judgment: unit which judges whether or not first communication information to be transmitted and received via one round of communication provided by the communication unit has all been transmitted or received; and a communication information process determination unit which, in the event that the communication unit is unable to transmit or receive the first communication information before it is judged by the communication completion judgment unit that the first communication information has all been transmitted or received, determines a process related to the first communication information in accordance with second communication information received via a next or subsequent round of communication.

6 Claims, 5 Drawing Sheets

INFORMATION PROCESSING SYSTEM, HOST DEVICE, AND PROGRAM FOR CAUSING COMPUTER TO EXECUTE INFORMATION PROCESSING METHOD INCLUDING COMMUNICATION COMPLETION JUDGING

BACKGROUND

1. Technical Field

The present invention relates to an information processing system, a host device, and a program for causing execution of an information processing method, and particularly to an information processing system, a host device, and a program for causing execution of an information processing method, which enable communication between the host device and a client device only while an operator operates the client device.

2. Related Art

At present, in a computer field, there is a host-based type information system composed of a host device and a client device. In many host-based type information systems, an operator operates the client device to designate an information processing, and the designation is transmitted from the client device to the host device. Also, the host device, in accordance with the designation, carries out the information processing, and notifies the client device of a result thereof.

An example of this kind of host-based type information system is JP-A-2003-157184. In the client-server configuration of JP-A2003-157184 is further configured such that, by communicating information related to a finish or execution condition of a program between the client computer and the server computer, the system monitors a result of the execution of the program. Also, with regard to each item of information to be communicated, a delivery thereof is confirmed in a communication protocol by both the client computer and the server computer.

Meanwhile, recently, an electronic data display medium, which includes a display screen, which is thin to such an extent that it can foe handled in approximately the same way as paper, has been put to practical use. This kind of display medium is also called electronic paper. Also, a host-based type information system configured by connecting the electronic paper as the client device to a computer or the like which serves as the host device has been considered. This kind of system can be said to serve a demand to avoid an increase in size caused by providing a large-sized control device in order to handle the electronic paper in the same way as paper.

It is undesirable that the electronic paper be provided with a complicated operating portion or control portion, as there is a demand for a reduction in weight and a simplification of the configuration so as to enable handling in generally the same way as paper. For this reason, a host-based type information system including electronic paper has been proposed in which the electronic paper communicates with the host device only while an operating button or the like provided on the electronic paper is touched with a dedicated pen or the like, and which transmits and receives communication information, including an identification signal from the client device indicating that an operation such as, for example, a rewriting of the display screen has been carried out, which corresponds to a process corresponding to the operation.

However, in the case that this kind of electronic paper is applied to the client device of JP-A-2003-157184, when the pen comes out of contact with the operating button in the middle of the communication, a situation occurs in which the communication is disrupted, such normal completion of signal reception in the host device becomes impossible. In this way, in the event that the transmission and reception of the communication information is not normally completed, the heretofore known host-based type information, system generally executes a process such as trying to retransmit the communication information.

Also, in the ease that a configuration is such that a plurality of the client devices can be connected to the host device, it is also considered that, although communication with one client device has not been normally completed, a signal is transmitted to the host device from another client device. In this kind of case, it is general that the host device side generates an error, judging that a request is inconsistent.

This kind of situation reduces processing efficiency of a host-based type information system using the electronic paper, resulting in a reduction in operability thereof.

SUMMARY

An advantage of some aspects of the invention is to provide an information processing system, a host device, and a program for causing a computer to execute an information processing method, in which a subsequent process can be executed without any problem even in the event that communication between the host device and a client device has been disrupted before a data transmission by the client device is normally finished.

In order to achieve the above advantage, a document processing system according to an aspect of the invention is an information processing system including a host device and a client device which requests the host device to process information, including: a communication unit which provides communication between the host device and the client device. The host device includes: a communication completion judgment unit which judges whether or not first communication information to be transmitted and received via one round of communication, provided by the communication unit has all been transmitted or received; and a communication information process determination unit which, in the event that the communication unit is unable to transmit or receive the first communication information, before it is judged by the communication completion, judgment unit that the first communication information has all been transmitted or received, determines a process related to the first communication information in accordance with second communication information received via a next or subsequent round, of communication.

According to this kind of aspect of the invention, the host device can judge whether or not the first communication information to be transmitted and received via one round of communication provided by the communication unit has all been transmitted or received. Also, in the event that the communication unit has become unable to transmit or receive the first communication information before it is judged that the first communication information has all been transmitted or received, it is possible, in accordance with the second communication information received via the next or subsequent round of communication, to determine the process related to the first communication information.

For this reason, according to the aspect of the invention, as the first communication information, even in the event that it has been disrupted during communication, is appropriately processed at the time of a next round of communication, it is possible to provide the information processing system in which, even in the event that communication, is disrupted, a subsequent process can be executed without any problem.

Also, in the information processing system according to the aspect of the invention, the communication unit includes: an operating portion provided on the client device side; a designation member which, being provided on the host device side, designates the operating portion; and a communication information transmission unit which, when the operating portion has been designated by the designation member, transmits communication, information corresponding to the designated operating portion.

According to this kind of aspect of the invention, it is possible to ensure communication only in the event that the operating portion on the client device side is operated with the designation member such as a pen on the host device side. This kind of configuration is effective in simplifying a control or a configuration related to communication of the client device, and in further reducing a size and a weight of the client device.

Also, in the information processing system according to the aspect of the invention, a plurality of the operating portions is provided corresponding to types of operations on the client device, and the communication information transmission unit transmits communication information indicating that operations corresponding to the operating portions have been designated.

According to this kind of aspect of the invention, the operation carried out on the client device can be easily detected on the host device side.

Also, in the information processing system according to the aspect of the invention, the communication information process determination unit, after suspending a process corresponding to an operation indicated by the first communication information, determines an execution of a process corresponding to a designation of an operation indicated by the second communication information.

According to this kind of aspect of the invention, after operating one operating portion, by an erroneous operation or the like, by operating another operating portion originally to be operated, it is possible to prevent an execution of an unintended process by an erroneous operation.

Also, in the information processing system according to the aspect of the invention, the communication information process determination unit, in the event that the operation indicated by the first communication information and the operation indicated by the second communication, information are different, after suspending the process corresponding to the operation, indicated by the first communication information, executes the process corresponding to the designation of the operation indicated by the second communication information and, in the event that the operation, indicated by the first communication information and the operation indicated by the second communication information are identical, determines a continuation of the process corresponding to the operation indicated by the first communication information.

According to this kind of aspect of the invention, even in the event that the communication of the first communication information has been disrupted by an operational error or the like, it is possible, by operating the operating portion again, to restart a process to be carried out via the disrupted communication. Also, in the event that a previous operation is an erroneous operation, the execution of the unintended process by the operational error can be prevented by an appropriate operation carried out later.

Also, in the information processing system according to the aspect of the invention, the operating portion includes a continuation designation button which designates a continuation of the process corresponding to the operation indicated by the first communication information, and the communication information process determination unit, by the communication unit receiving communication information transmitted by an operation of the continuation designation button, determines the continuation of the process corresponding to the operation indicated by the first communication information.

According to this kind of aspect of the invention, as communication carried out by the previous operation is in an uncompleted condition due to the operation error, even in the event that a further operation has been carried out, it is possible to restart and appropriately complete a process to be carried out by the previous operation.

Also, in the information processing system according to the aspect of the invention, the communication information process determination unit, no matter whether the operation indicated by the first communication information and the operation indicated by the second communication information are different or identical, after continuing and completing the process corresponding to the operation indicated by the first communication information, determines a process corresponding to the designation of the operation indicated by the second communication information.

According to this kind of aspect of the invention, even in the event that the communication of the first communication information has been disrupted in the middle by the operational error or the like, it is possible, by the subsequent operation, to reliably restart a process to be executed via the disrupted communication.

Also, according to another aspect of the invention, a host device, including a communication unit which communicates with a client device, further includes: a communication completion judgment unit which judges whether or not first communication information to be transmitted and received via one round of communication has all been transmitted and received; and a communication information process determination unit which, in the event that the communication unit is unable to receive the first communication information before it is judged by the communication completion judgment unit that the first communication information has all been transmitted and received, determines a process related to the first communication information based on second communication information received via a next or subsequent round of communication.

According to this kind of aspect of the invention, the host device can judge whether or not the first communication information to be transmitted and received via one round of communication, provided by the communication unit has all been transmitted or received. Also, in the event that the communication unit has become unable to transmit or receive the first communication information before it is judged that the first communication information has all been transmitted or received, it is possible, in accordance with the second communication information received via the next or subsequent round of communication, to determine the process related to the first communication information.

For this reason, according to the aspect of the invention, as the first communication information, even in the event that it has been disrupted during communication, is appropriately processed at the time of a next round of communication, it is possible to provide the client device in which, even in the event that communication is disrupted, a subsequent process can be executed without any problem.

Also, a program for causing execution of an information processing method according to a further aspect of the invention is provided. The program causes execution of an information processing method, by a host device including a communication unit which communicates with a client device. The program comprises instructions for directing the performance of the following steps: a communication completion judgment step of judging whether or not first communication information to be transmitted and received via one round of communication has all been transmitted and received by the communication unit; and a communication information process determination step of, in the event that the communication unit is unable to receive the first communication information before it is judged in the communication completion judgment step that the first communication information has all been transmitted and received, determining a process related to the first communication information based on second communication information received via a next or subsequent round of communication.

According to this kind of aspect of the invention, the host device can judge whether or not the first communication information to be transmitted and received via one round of communication provided by the communication unit has all been transmitted or received. Also, in the event that the communication unit has become unable to transmit or receive the first communication information before it is judged that the first communication information has all been, transmitted or received, it is possible, in accordance with the second communication information received via the next or subsequent round of communication, to determine the process related, to the first communication information.

For this reason, according to the aspect of the invention, as the first communication information, even in the event that it has been disrupted during communication, is appropriately processed at the time of a next round of communication, it is possible to provide the program, for causing the computer to execute the information processing method in which, even in the event that communication is disrupted, a subsequent process can be executed without any problem.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given of an information processing system a host device, and a program for causing execution of an information processing method according to an embodiment of the invention.

Figure 1:
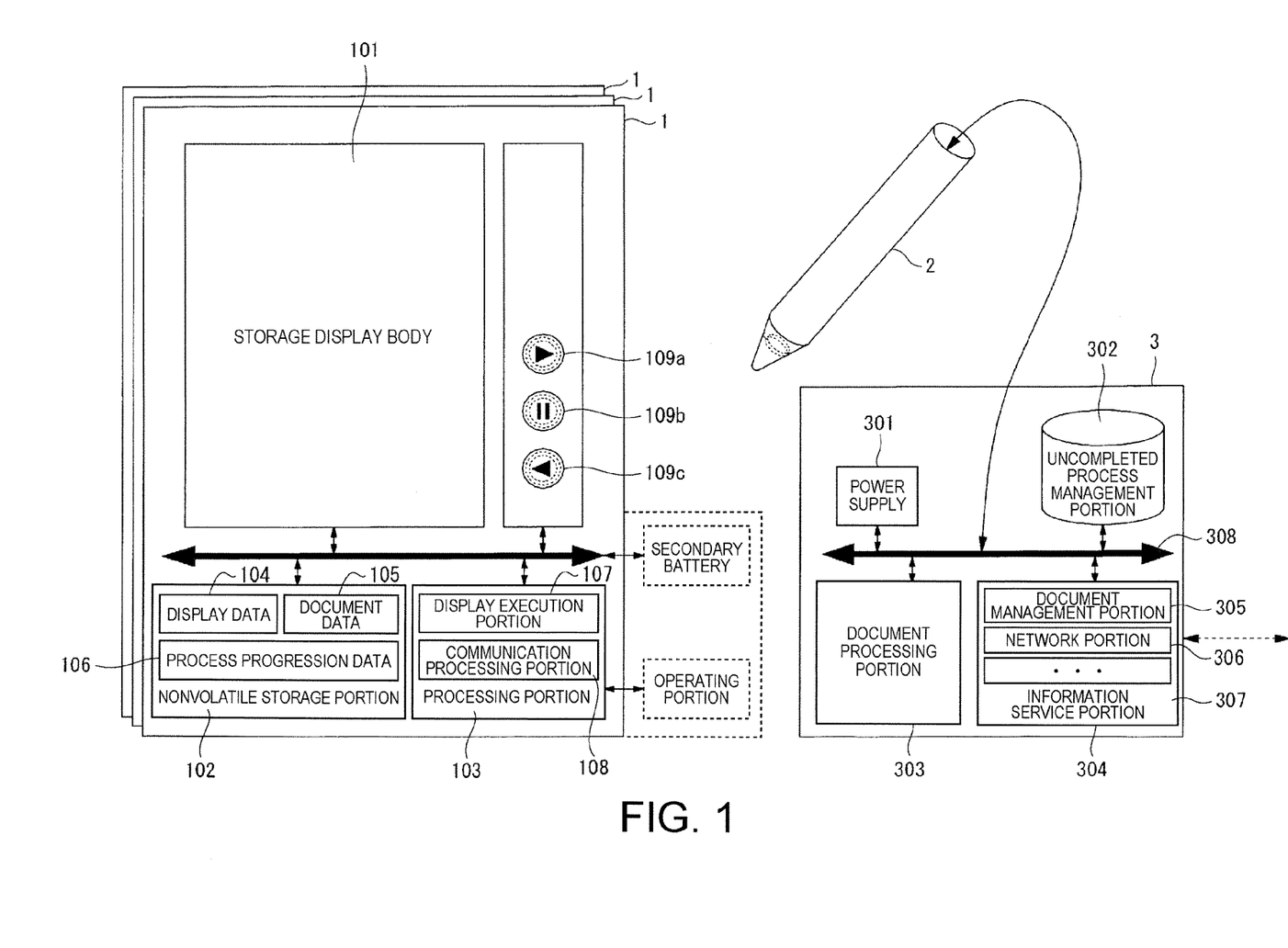
FIG. 1 illustrates an information processing system according to an embodiment of the invention.

FIG. 1 illustrates an information processing system according to an embodiment of the invention. A configuration shown in the FIG., including a host device 3 and a client device 1 which is used for a display and an operation of a processing result of the host device 3, is an information processing system furnished with a communication unit which causes display data or information related to an operation to foe communicated between the client device 1 and the host device 3. In the embodiment, the host device 3 and the client device 1 are connectable along with the operation, and a plurality of the client devices 1 can be alternately used. In the host device 3, a process is caused to progress by an event drive type driven by the operation on the client device 1.

In the present embodiment, the communication unit comprises operating buttons 109a, 109b and 109c which constitute an operating portion provided on the client device 1 side, a pen 2 which, being provided on the host device 3 side via a wireless or wired connection, is a designation member making contact with the operating buttons 109a to 109c, and a communication processing portion 108, to be described hereafter, of the client device 1. When the pen 2 makes contact with the operating button 109a, 109b or 109c, the communication processing portion 103 transmits communication information corresponding to the contacted operating button.

Hereafter, a description will be given of each of the client device 1, the pen 2 and the host device 3.

Client Device

The client device 1 is comprised of a thin display and a comparatively simple component for displaying an image (including a letter and a picture) on the display. This kind of client device configuration will, in this embodiment, for referred to hereafter as electronic paper.

The client device 1 includes a self-holding display component 101, which functions as the display and is referred to herein simply as a display. The display 101, being of, for example, an A4 size and a high pixel density, displays image data by a control of a display execution portion 107. The display 101, having a property of consuming power only in a case of rewriting a temporarily displayed image, is of a type that is often employed in the electronic paper.

As the display 101, it is possible to employ, for example, an electrophoretic display, a cholesteric display, a display using a charged toner, a display using a twist ball, an electrodeposition display or the like.

Also, the client device 1 includes a nonvolatile memory portion 102 and a processing portion 103 as components for displaying the image. The nonvolatile memory portion 102 includes display data 104, document data 105 and process progression data 106. The display data 104 are received from the host device 3 and displayed on the display 101. The process progression data 106 are data in which is recorded a progression of a process carried out by the host device in response to the client device 1. Also, it is acceptable that the document data 105 and the process progression data 106 are provided in either the client device 1 or the host device 3.

The processing portion 103 includes the display execution portion 107 and the communication processing portion 108. The display execution portion 107, by directly controlling the display 101 in accordance with an updating of the display data stored in the nonvolatile memory portion 102, causes the display 101 to display the updated display data 104. Specifically, the display execution portion 107, with reference to the display data 104, by driving an X driver and a Y driver of the display 101, causes the display 101 to display a raster image.

In this embodiment, as a drive method of the drivers, it is possible to employ, for example, a passive matrix drive method, a TFT (Thin Film Transistor) method or a D-TFD (Digital Thin Film Diode) method.

Also, the host device includes a plurality of the operating buttons 109a, 109b and 109c. The operating buttons 109a to 109c are provided corresponding to types of operator's operation on the client device 1. The operation types refer, for example, to a rewriting (a paging) of an image displayed on the display 101 and the like. In this embodiment, the paging operation is further divided into a previous page display and a subsequent page display, to which the operating buttons 109a and 109c are assigned, respectively.

Furthermore, in this embodiment, the host device includes a continuation designation button 109b. The continuation designation button 109b is a button which, in the event that an operation has been disrupted before communication, connected, with a process corresponding to the operation is completed, is used to designate a continuation of the process corresponding to the operation and, in the embodiment, it is a component dedicated to this kind of designation.

The communication processing portion 108 generates a signal corresponding to an operating button, of the operation buttons 109a to 109c, operated with the pen 2, and generates communication information to be transmitted to the host device 3. This kind of communication, processing portion 108 functions as a communication information transmission unit of the embodiment.

Host Device

The host device 3 includes a document processing portion 303 which judges whether or not communication information to be transmitted and received via one round of communication has all been transmitted and received. Also, as the document processing portion 303 judges a progression of the process with reference to an uncompleted process management portion 302, the document processing portion 303 and the uncompleted process management portion 302 function as a communication completion judgment unit and a communication information process determination unit.

The document processing portion 303 and the uncompleted process management portion 302, in the event that, before it is judged that a certain item of communication information (first communication information) has all been transmitted and received, the pen 2 becomes unable to receive the communication information, determines a process related to the first communication information based on another item of communication information (second communication information) which the pen 2 has received via a next or subsequent round of communication.

The uncompleted process management portion 302 records a type of a process executed by the host device 3 and a stage of the executed process (how much of a series of processes has been completed). The recording is realised by recording a parameter or intermediate data of the process (for example, an objective display page in the paging). The record made by the uncompleted process management portion 302 serves as process contexts used in restarting a process designated by communication information of which communication, has been suspended.

The record made by the uncompleted process management portion 302 not being limited to a configuration in which it is recorded only in the host device 3, it is also acceptable to save a part of it in the client device 1 as the process progression, data 106.

Also, the host device 3 includes a power supply 301, the document processing portion 303 and an information service portion 304. The power supply 301 supplies power to the host device 3 and the pen 2 connected to the host device 3.

The document processing portion 303 interprets communication information transmitted from the client device 1, and executes a process in accordance with operation details indicated by the communication information.

More specifically, the document processing portion 303, in accordance with each kind of communication information transmitted from the client device 1, reads a process routine stored in advance, and executes a process corresponding to the communication information. As a specific example of the process, a description will be given of a process in a case in which the paging is designated using the client device 1. In the case in which the paging is designated by means of the operating button 109a or 109c, the document management portion 305 acquires information (process information) regarding a page currently displayed on the display 101 and document data from the nonvolatile memory portion 102 via the operating button 109a or 109c and the pen 2.

Furthermore, the document processing portion 303, based on the acquired process information and document data, executes a next page layout process, and generates next page display data. The generated display data is stored in the nonvolatile memory portion 102 via the operating button 109a or 109c and the pen 2.

The information service portion 304 is a component for using document data transmittable to the client device 1 or another network resource. For this reason, it includes a document management portion 305, which manages the document data and the display data, and a network portion 306 for a downloading etc. of the document data and the display data from an exterior.

Operating Buttons and Pen

The operating buttons 109a to 109c and the pen 2 are an interface between the client device 1 and the host device 3. That is, the pen 2 contains an antenna coil inside it. Meanwhile, each of the operating buttons 109a to 109c of the client device 1 also contains an antenna coil in the same way. By touching one of the operating buttons 109a to 109c with the pen 2, the touched one of the operating buttons 109a to 109c is designated. By the pen 2 and the operating button touching, their antenna coils are electromagnetically connected, and a signal for specifying the operating button the pen 2 has touched is generated. In the embodiment, the communication processing portion 103 generates communication information corresponding to the signal generated by the communication processing portion 108, and the pen 2 transmits the communication information to the host device 3.

The information processing system of the embodiment is not limited to the configuration described heretofore. That is, instead of the display data 104, the document data 105 and the process progression data 106 being saved in the client device 1, it is acceptable to configure in such a way as to save them in the host device 3. Also, a designation of each of the operating buttons 109a to 109c not being limited to the designation by the touching, it is acceptable to have a configuration in which communication is ensured by both the pen 2 and the operating button approaching to a very short prescribed distance or less from one another.

Operation Mode

Next, a description will be given of a mode of an operation executed in the information processing system of the embodiment. The operation, mode refers to an operation by the host device 3 in a case in which communication of the first communication information is disrupted before completed. In the embodiment, this hind of operation mode will be referred to as a policy.

The operation by the host device 3 is determined when the host device 3 receives a next or subsequent item of communication information after the communication is disrupted. In the following description, a process which, being an operation designated by the disrupted communication, is uncompleted will be referred to as an uncompleted process.

Policy A

In a policy A, the uncompleted process is suspended, and a process based on a new designation, whether identical or different, is executed. That is, the policy A is a mode in which, after a process corresponding to an operation indicated by the first communication information is suspended, a process corresponding to an operation indicated by the second communication information is executed.

As used in the embodiment, the suspension of the process refers to a discard of a progression record of a process carried out until communication is disrupted, a discard of data which was being received by the host device 3 until the communication, is disrupted, or which has been in the middle of a transfer to the client device 1, and an initialization of the uncompleted process management portion 302. That is, the suspended process is not restarted unless a new designation is made separately.

Policy B in a policy B, the uncompleted process is continued with respect to a designation identical to that of the uncompleted process. That is, the policy 3 is a mode in which, in the event that the operation indicated by the first communication information and the operation indicated by the second communication information are different from one another, the process corresponding to the designation of the operation indicated by the second communication information is executed, after the process corresponding to the operation indicated by the first communication information is suspended while, in the event that the operation indicated by the first communication information and the operation indicated by the second communication information are identical to each other, the process corresponding to the operation indicated by the first communication information is continued.

This kind of policy is provided, for example, for a case in which, although the operating button 109*a* is operated to instruct the host device 3 to page, the pen 2 has come out of contact with the operating button 109*a* without completing a display of the objective page.

In this kind of case, according to the policy B, in the event that the pen 2 has come off the operating button 109*a* before the display of the objective page is completed, by touching the operating button 109*a* again, it is possible to continue to display the objective page. Meanwhile, in the event that the operating button 109*a* is touched with the pen 2 although the objective page has been displayed, by freshly touching the operating button 109*c* with which the previous page is displayed, it is possible to return to the objective page and display it.

Policy C

In a policy C, an explicit instruction to continue the uncompleted process is used. That is, the policy C is for the client device 1 to transmit communication information (a continuation request) explicitly requesting a continuation of the uncompleted process, and for the host device 3 to restart and continue the uncompleted process in the event that it is requested to continue it.

in the embodiment, the continuation designation button 109*b* is provided in order to realize the policy C. The continuation designation button 109*b* is a button dedicated to an instruction to continue the uncompleted process, and the operator, by touching the continuation designation button 109*b*, can explicitly instruct the host device 3 to continue the uncompleted process.

In the event that the operator touches the continuation designation button 109*b* with the pen 2, the document processing portion 303, with reference to the data recorded in the uncompleted process management portion 302, judges how much of the uncompleted process has been processed and where it has been suspended. Then, the document processing portion 303 executes the uncompleted process again from, the suspended condition.

The policy C is provided assuming a case in which the operating button 109*a* and the operating button 109*c* have been touched in quick succession in a rush to page in an operation of the paging or the like. That is, according to the policy C, even in the event that communication is suspended although a display process of a page instructed to be displayed first is uncompleted, it is possible to touch the continuation designation button 109*b* and continue the uncompleted process.

Policy D

In a policy D, a process based on a new instruction, whether identical or different, is executed after the uncompleted process is continued. That is, the policy D is a policy in which, no matter whether the operation indicated by the first communication, information and the operation indicated by the second communication information are identical or different, the document processing portion 303 and the uncompleted process management portion 302, after continuing and completing the process corresponding to the operation indicated, by the first communication information, execute the process corresponding to the operation indicated by the second communication information.

According to this kind of policy, even in the event that a process of the paging or the like has been finished incomplete by mistake during an operation of the operating button 109*a* or the like, by touching an operating button for a next operation, it is possible to continue to execute the process finished incomplete, and complete it normally.

Next, a description will be given, using the flowcharts of FIGS. 2A and 2B to 5A and 5B, of an operation of the heretofore described information processing system of the embodiment.

Figure 2A:
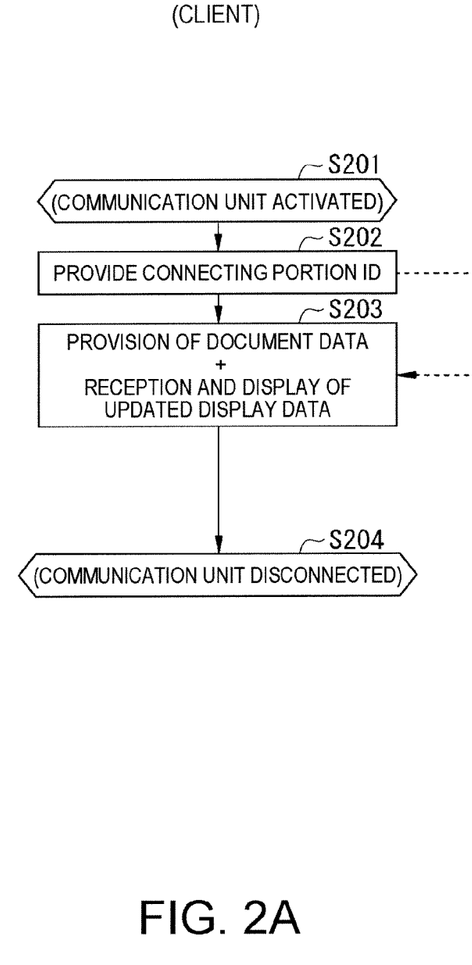
FIGS. 2A and 2B illustrate an interaction between a client device and a host device of the information processing system according to an embodiment of the invention.
Figure 2B:
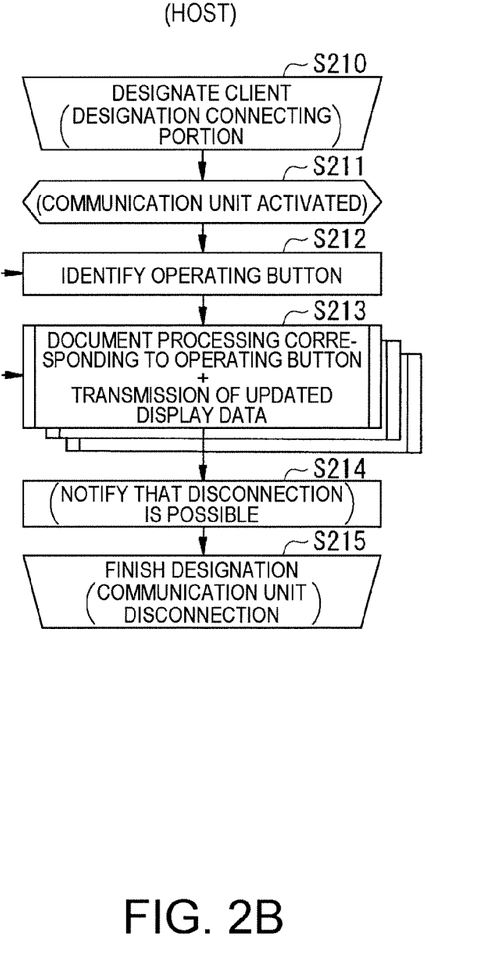

The flowcharts of FIGS. 2A and 2B illustrate an interaction between the client device 1 and the host device 3 of the information processing system of the embodiment. FIG. 2A shows an operation of the client device 1, and FIG. 2B shows an operation of the host device 3.

When the operator touches the operating button 109*a* or the like of the client device 1 with the pen 2 (step S210), communication is activated between the host device 3 and the client device 1 (steps S202 and S211). Also, by an operating button and the pen 2 making contact with each other, communication information including an ID (a connecting portion ID) specifying a touched operation button, of the operating buttons 109*a* to 109*c*, is provided from, the communication processing portion 108 to the host device 3. The host device 3 receives the communication information, and identifies and specifies an operated client device and operating button (S202 and S212).

Next, the client device 1 provides the host device 3 with data related to a document currently displayed on the display 101. The host device 3, based on the data related to the document and the touched operating button, executes a document process such as a generation of display data, and transmits the generated display data to the client device 1 via the pen 2 as updated display data. The client device 1 receives the updated display data, and displays it on the display 101 (S203 and S213).

After the above process, in the host device 3, the document processing portion 303 can notify a user, by means of sound, light or the like, that the communication can be disconnected as the transmission of the updated display data has been completed (S214). By the pen 2 being released from the touching relation with the operating buttons 109*a* to 109*c*, the communication is disconnected on the client device 1 side. Also, the host device 3 also detects that the communication has been disconnected, and disconnects the communication unit (S204 and S215).

The document processing portion 303 of the host device 3 divides details of the designated process in advance by process step, checks a communication, condition every time each step is finished, detects a completion ratio of the process in the case in which the communication has been disrupted, and records it in the uncompleted process management portion 302. This kind of process of the document processing portion 303 will be shown in a flowchart and described.

Figure 3:
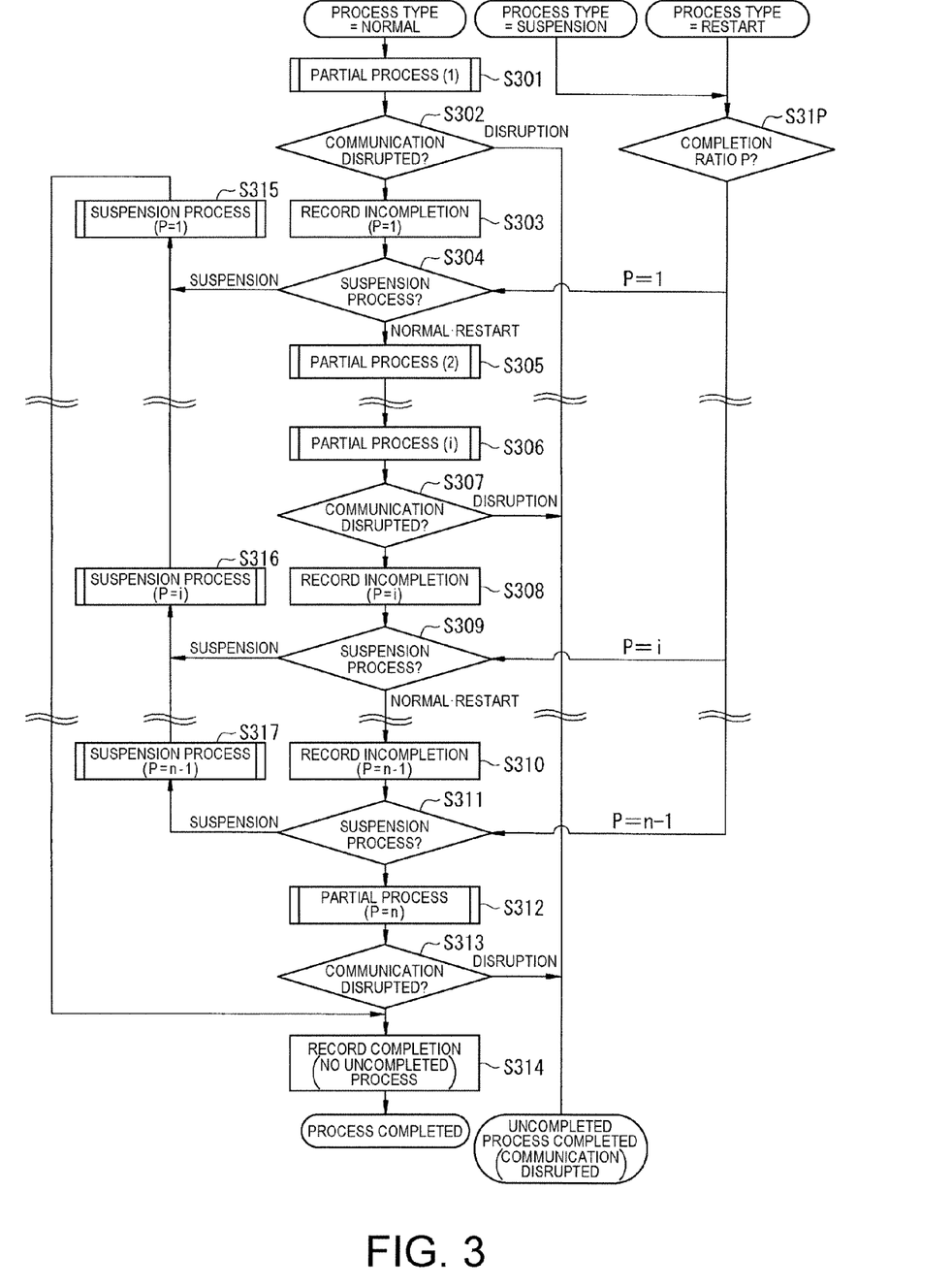
FIG. 3 is a flowchart illustrating an operation in which the host device judges whether a process has been uncompleted or completed.

FIG. 3 is a flowchart for illustrating an operation for the host device 3 to judge whether the process is uncompleted or completed. The flowchart shown in FIG. 3 is also applied to any of cases of a start of a certain communication process (normal), a suspension thereof and a process restart. In the embodiment, first, a description will be given of the case of the start of the normal process.

In the case of starting the normal process (a process type=normal), the document processing portion 303, for example, in a case of being instructed by the client device 1 to display a 6*th* page in accordance with the paging, executes the partial process (1) obtained by dividing the process into n parts (S301). After finishing the partial process (1), the document processing portion 303 judges whether or not communication carried out with the client device 1 via the pen 2 has been disrupted (S302).

If it is judged in step S302 that the communication has been disrupted (S302: disruption), it is unknown whether or not the partial process (1) has been normally completed. For this reason, the partial process (1) is also completed as being uncompleted. Also, if it is judged that the communication has not been disrupted, it is recorded in the uncompleted process management portion 302 that the process has been completed up to the partial process (1) (the whole process is uncompleted) (S303). In the embodiment, when the host device 3 finishes transferring the display data, the uncompleted process management portion 302 is initialized as a paging for one page having been finished.

After the above process, in a case in which the process is restarted or suspended in a condition in which, it has been completed up to the partial process (1), a restart or suspension flow converges or diverges at the time of a recording of a partial completion in step S303 (S304). In the case of the normal process (S304: normal), the process proceeds to a partial process (2).

The document processing portion 303 judges the disruption of the communication even after executing the partial process (2) (S307) and, if the communication has been disrupted (disruption), finishes the process as not having been appropriately completed. Also, if the process has been completed up to a partial process (i) (non-disruption), it is recorded that the process has been completed up to the partial process (i) (S308).

In the embodiment, the partial processes are sequentially executed in the above way and, only if the partial process has been completed without the communication disrupted, it is recorded that the relevant partial process has been completed. In this way, if all the n partial processes have been completed (S313: non-disruption), it is recorded in the uncompleted process management portion 302 that there is no uncompleted process, and the process is completed (S314).

Meanwhile, in the above process, the disrupted communication is restarted or suspended by a restart process (process type=restart) or a suspension process (process type=suspension). The restart or suspension of the process is determined by the type of each heretofore described policy and each designated operating button 109*a* to 109*c*.

That is, in the policies, if an operating button to designate the process restart has been designated in a policy (process type=restart), the host device 3, with reference to the uncompleted process management portion 302, specifies a stage in which the process is completed (S318). Then, the restart process converges on a process flow at a time immediately after each step in which it has been recorded that the specified partial process has been completed (S304, S309 and S311) and, at each convergent point, the process proceeds to an execution of a partial process to follow (S304: restart, S309: restart, and S311: restart).

Also, if the operator has carried out the suspension process (process type=suspension), in the same way, the host device 3, with reference to the uncompleted process management portion 302, specifies a step in which the process is completed (S318). Then, it returns to a time immediately after each step in which it has been recorded that the specified partial process has been completed (S304, S309 and S311), and moves to a suspension process corresponding to the time (S304, S309 and S311: suspension). The suspension process corresponds to a sequential execution of partial suspension processes (S315, S316 and S317) corresponding to the individual partial processes, but is also sometimes a partial suspension process in which there is no substantial process. After a completion of the series of suspension processes, it is recorded in the uncompleted process management portion 302 that there is no uncompleted process.

By this means, in this embodiment, the normally finished partial process is recorded in the uncompleted process management portion 302. For this reason, if the uncompleted partial process is suspended or restarted, by the document processing portion 303 referring to a completion ratio P receded in the uncompleted process management portion 302 (S319), it is possible to prevent an already completed process, of the uncompleted processes, from being processed again.

In the above process, a granularity or frequency managing the completion ratio (in which stage the completion ratio is to be recorded, or a frequency of the recording) is set appropriately in this embodiment.

Next, a description will be given, using flowcharts shown in FIGS. 4A, 4B, 5A and 5B, of the suspension and continuation (restart) of the uncompleted process determined by the previously described policies A to D.

Figure 4A:
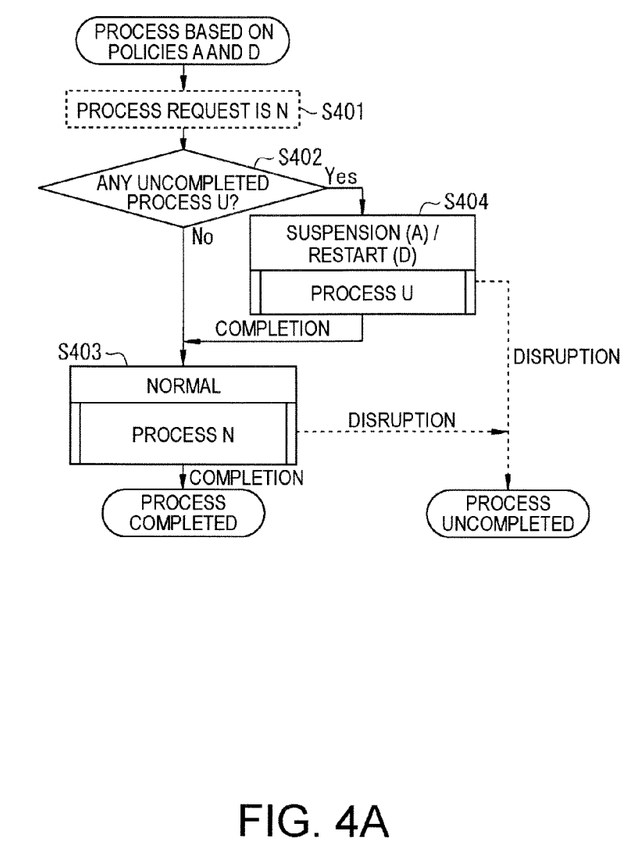
FIGS. 4A and 4B are flowcharts showing a case of judging a suspension or a continuation of the uncompleted process based on a policy according to an embodiment of the invention.

FIG. 4A is a flowchart in a case of judging the suspension or continuation of the uncompleted process based on the policies A and D. If the client device 1 mates a process request H to the host device 3 (S401), the document processing portion 303, with reference to the uncompleted process management portion 302, judges whether or not there is any uncompleted process U (S402). If there is no uncompleted process U (S402: No), a process N is executed afresh by (process type=normal) of the flowchart shown in FIG. 3 (S403).

In step S402, if it is judged that there is the uncompleted process U (S402: Yes), the (process type=restart) or (process type=suspension) process of the flowchart shown in FIG. 3 is executed. That is, if the document processing portion 303 operates in the policy A, the flowchart of FIG. 3 is executed from a (process type=incompletion) route. Meanwhile, if the document processing portion 303 operates in the policy D, the flowchart of FIG. 3 is executed from a (process type=restart) route. Then, when the process is completed in either case (S404: completion), the process N is normally executed afresh thereafter (S403).

If the communication is disrupted during the restart process of the process U or the normal execution of the process M, as shown in FIG. 3, each process is put into a process incompletion condition (S404: disruption or S403: disruption). That is, when a further subsequent operation is carried out, the same flowchart is applied with a process in execution during the disruption as a new uncompleted process U.

Figure 4B:
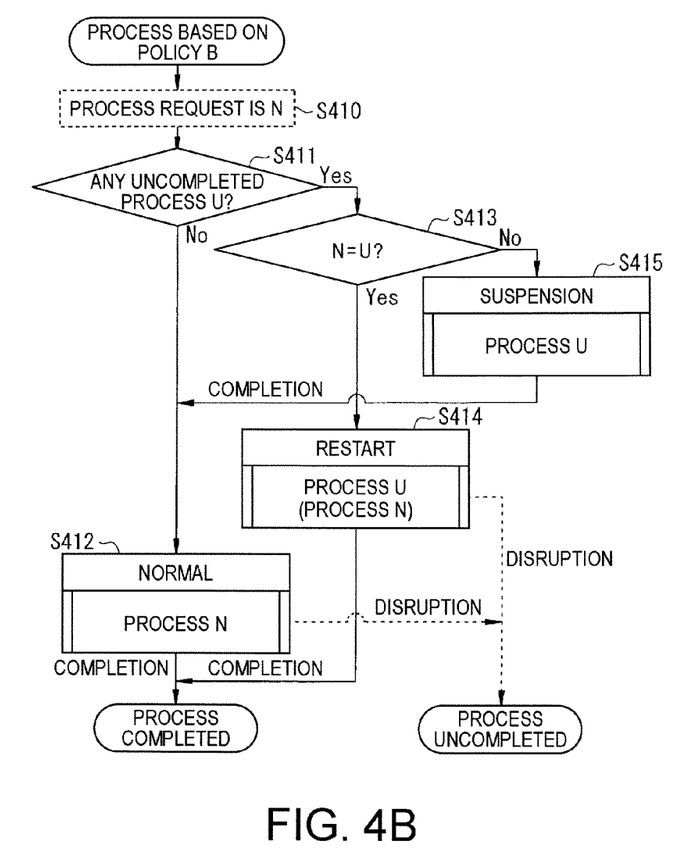

FIG. 4B is a flowchart in a case of judging the suspension or continuation of the uncompleted process based on the policy 3. If the client device 1 makes a process request N to the host device 3 (S410), the document processing portion 303, with reference to the uncompleted process management portion 302, judges whether or not there is any uncompleted process 17 (S411). If there is no uncompleted process U (S411: No), the process N is executed in accordance with (process type = normal) of the flowchart of FIG. 3 (S412).

If it is judged in step S411 that there is the uncompleted process U (S411: Yes), the document processing portion 303 judges whether or not a process in which the process N and the process u are identical has been requested (S413). If a result of the judgment is that the process N and the process U are not the identical process (S413: No), the uncompleted process U is suspended and finished (S415) and, subsequently, the process N is normally processed (S412).

Meanwhile, if the process N and the process U are the identical process (S413: Yes), the process U continues to be executed (S414), and the process is finished without the process N (the process identical to the process U) executed afresh.

If the communication is disrupted during the restart process of the process U or the normal execution of the process N, as shown in FIG. 3, each process is put into a process incompletion condition (S414: disruption or S412; disruption). That is, when a further subsequent operation is carried out, the same flowchart is applied with the process in execution during the disruption as a new uncompleted process U.

Figure 5A:
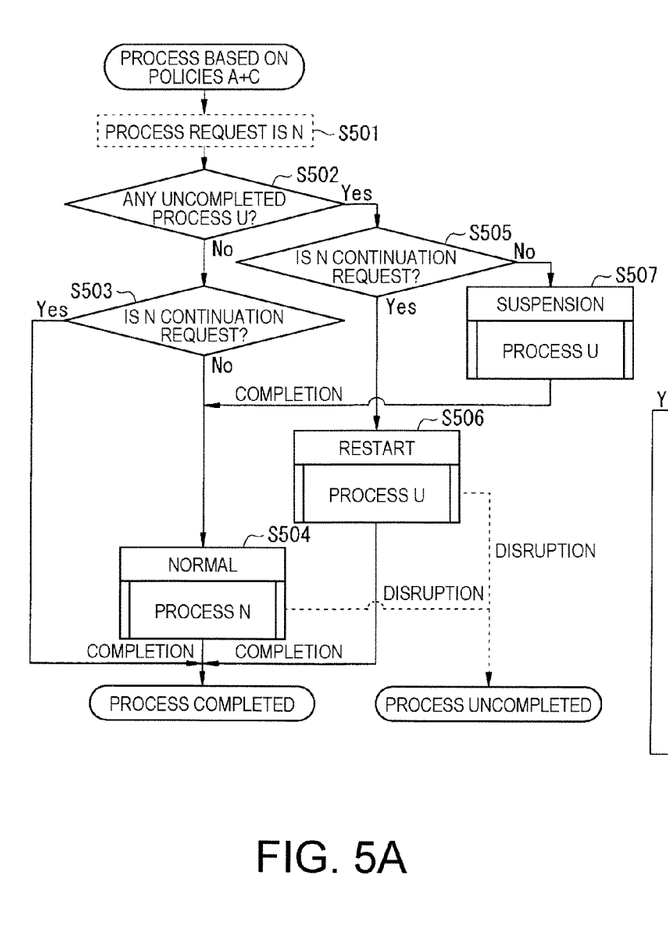
FIGS. 5A and 5B are other flowcharts showing a case of judging the suspension or continuation of the uncompleted process based on the policy according to an embodiment of the invention.

FIG. 5A is a flowchart in a case of judging the suspension or continuation of the uncompleted process based on the policies A and C. If the client device 1 makes a process request N to the host device 3 (S501), the document processing portion 303, with reference to the uncompleted process management portion 302, judges whether or not there is any uncompleted process U (S502). If there is no uncompleted process U (S502: Ho), it is judged whether or not the process N is a continuation request generated by operating the continuation designation button 109b (S503).

If a result of the judgment in step S503 is that the process U is the continuation request (S503: Yes), the document processing portion 303 completes the whole process without processing anything (as there is no uncompleted process to be continued). Also, if the process N is not the continuation request (S503: No), the process N is normally executed (S504).

If it is judged in step S502 that there is the uncompleted process U (S502: Yes), the document processing portion 303 judges whether or not the process N is a continuation request generated by operating the continuation designation button 109b (S505). If a result of the judgment is that the process N is the continuation request (S505: Yes), the process U is continuously executed (S506). Also, if the process N is not the continuation request (S505: No), the process U is suspended (S507), and the process N is executed thereafter.

In either of step S504 or step S506, if the communication is disrupted based on the flowchart of FIG. 3, the process is finished as being uncompleted (S504; disruption and S506: disruption). That is, in this case, when a further subsequent operation is carried out, the same flowchart is applied with the process in execution during the disruption as a new uncompleted process U.

Figure 5B:
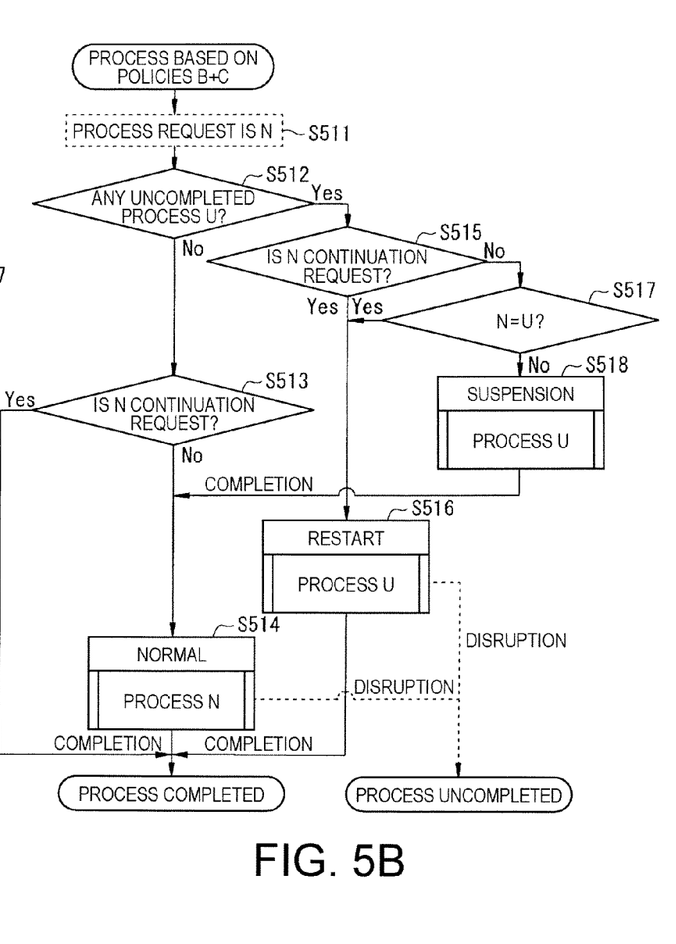

FIG. 53 is a flowchart in a case of judging the suspension or continuation of the uncompleted process based on the policies B and C. If the client device 1 makes a process request N to the host device 3 (S511), the document processing portion 303, with reference to the uncompleted process management portion 302, judges whether or not there is any uncompleted process u (S512). If there is no uncompleted process U (S512: No), it is judged whether or not the process N is a continuation request generated by operating the continuation designation button 109b (S513).

If a result of the judgment is that the process N is the continuation request (S513: Yes), the document processing portion 303 completes the whole process without processing anything (as there is no uncompleted process to be continued). Also, if the process N is not the continuation request (S513: No), the process N is normally executed (S514).

If it is judged in step S512 that there is the uncompleted process U (S512: Yes), the document processing portion 303 judges whether or not the process N is the continuation request (S515). If a result of the judgment is that the process N is the continuation request (S515: Yes), the process U is continuously executed (5516).

Also, if the process N is not the continuation request (S515: No), first, it is judged whether or not the process N and the process U are the identical process (S517). At this point, if the process N and the process U are the identical process (S517: Yes), it is equivalent to the case in which the process N is the continuation request (S515: Yes). If the process N and the process U are not the identical process (S517: No), the process U is suspended (S518), and the process N is executed (S514).

In either of step S514 or step S516, if the communication is disrupted based on the flowchart of FIG. 3, the process is finished as being uncompleted (S514: disruption and S516: disruption). That is, in this case, when a further subsequent operation is carried out, the same flowchart is applied with the process in execution during the disruption as a new uncompleted process U.

In order to realize the heretofore described flowcharts by means of software, various specific methods can be considered. For example, while an immediately previous process is incomplete, they can also be realized by a suspension process routine or a restart process routine being recorded as a dispatch destination of (the interruption raised by) successive button operation. In the case that the information processing system of the embodiment is configured by this kind of method, a rewriting of a dispatch table is executed by the uncompleted process management portion 302.

In the heretofore described embodiment, even in the event that communication information is disrupted during communication, as an appropriate process is carried out at the time of a next round of communication, it is possible, even in the event that the communication is disrupted, to execute a subsequent process without any problem.

Also, the embodiment, as described heretofore, responds not only to a disruption of a signal transmitted from the client device 1 to the host device 3, but can also be applied to a case in which the communication is disrupted while display image data or the like are transmitted from the host device 3 to the client device 1. That is, in the event that communication from the host device 3 to the client device is disrupted, the host device 3 can also receive communication information transmitted next from the client device 1 and, in accordance with the communication information, judge a display data transfer suspension, restart or the like.

According to the heretofore described process, the embodiment can operate in the following way.

That is, the host device 3, in the event that it is instructed to page by the client device 1, and the instruction is disrupted in an incomplete condition, registers a paging process, and registers that a page to be displayed is, for example, a $6^{th}$ page. After the registration, it records a completion ratio 1. Next, it generates display data 104 of the $6^{th}$ page from document data 105. When completing the generation of the display data, the host device 3 records a completion ratio 2.

Next, the host device 3 starts a transfer of the display data to a client, and updates the completion ratio by +1 for each prescribed unit of transfer completion. Before the transfer completion, for example, in the event that communication is disrupted at a stage of a completion ratio 4, and the operator instructs the paging again from the client device 1 side, the host device 3 refers to the uncompleted process management portion 302. A result of the reference is that the $6^{th}$ page is being processed at present, and that a completion ratio of the process is 4, and the host device 3, based on any of the heretofore described policies, executes a discard of a process progression (for example, storage details), an initialization of the uncompleted process management portion 302 or the like.

In order to newly display a $7^{th}$ page, the host device 3, as well as storing a fact that the display page is the $7^{th}$ page, records the completion ratio 1 in the uncompleted process management portion 302. Then, it generates display data of the $7^{th}$ page from the document data.

Also, in the information processing system of the embodiment, there is a possibility that the operator continuously operates the operating buttons 109a to 109c and, before the previous communication is completed, designates a next round of communication. For this reason, it can be considered, for example, that the operator, while continuously operating the operating buttons 109a for the purpose of displaying a $9^{th}$ page, suspends the operation by an operational error before communication of the $9^{th}$ page is completed.

In the embodiment, the continuation designation button 109b is provided assuming this kind of case. When the operator operates the continuation designation button 109b, the host device 3 can start an uncompleted process continuation process and restart the process as if there were no disruption in the middle.

In the heretofore described embodiment, as the communication information, even in the event that it is disrupted during communication, is appropriately processed at the time of a next round of communication, it is possible, even in the event that the communication is disrupted, to execute a subsequent process without any problem. That is, it is possible to provide a high operability information processing system in which it is possible to give an instruction to restart a process which the operator has temporarily suspended, and to execute an appropriate process in line with the operator's intention.

The entire disclosure of Japanese Patent Application No. 2006-80370, filed Mar. 23, 2006 is expressly incorporated by reference herein.

What is claimed is:

1. An information processing system, comprising:
a host device;
a client device which requests the host device to process information, the client device including a plurality of operating portions corresponding to a plurality of operations of the client device; and
a communication unit which provides communication between the host device and the client device, the communication unit including a designation member configured to designate an operating portion from the plurality of operating portions of the client device and a communication information transmission unit which transmits communication information corresponding to the designated operating portion when the designated operating portion is designated by the designation member;
wherein the host device includes:
a communication completion judgment unit which judges whether or not first communication information to be transmitted and received via one round of communication provided by the communication unit has all been transmitted or received; and
a communication information process determination unit which, in the event that the communication unit is unable to transmit or receive the first communication information before it is judged by the communication completion judgment unit that the first communication information has all been transmitted or received, determines a process related to the first communication information in accordance with second communication information received via a next or subsequent round of communication;
and wherein the communication information process determination unit, in the event that the operation indicated by the first communication information and the operation indicated by the second communication information are different, after suspending the process corresponding to the operation indicated by the first communication information, executes the process corresponding to the designation of the operation indicated by the second communication information and, in the event that the operation indicated by the first communication information and the operation indicated by the second communication information are identical, determines a continuation of the process corresponding to the operation indicated by the first communication information.

2. The information processing system according to claim 1, wherein
the communication information process determination unit, after suspending a process corresponding to an operation indicated by the first communication information, determines an execution of a process corresponding to a designation of an operation indicated by the second communication information.

3. The information processing system according to claim 1, wherein
the operating portion includes a continuation designation button which designates a continuation of the process corresponding to the operation indicated by the first communication information, and
the communication information process determination unit, by the communication unit receiving communication information transmitted by an operation of the continuation designation button, determines the continuation of the process corresponding to the operation indicated by the first communication information.

4. The information processing system according to claim 1, wherein
the communication information process determination unit, no matter whether the operation indicated by the first communication information and the operation indicated by the second communication information are different or identical, after continuing and completing the process corresponding to the operation indicated by the first communication information, determines a process corresponding to the designation of the operation indicated by the second communication information.

5. A host device including a communication unit which is adapted to communicate with a client device, comprising:
- a communication completion judgment unit which judges whether or not first communication information to be transmitted and received via one round of communication has all been transmitted and received; and
- a communication information process determination unit which, in the event that the communication unit is unable to receive the first communication information before it is judged by the communication completion judgment unit that the first communication information has all been transmitted and received, determines a process related to the first communication information based on second communication information received via a next or subsequent round of communication;
- the host device receiving communication information corresponding to a designated operating portion from a plurality of operating portions of the client device, the plurality of operating portions corresponding to a plurality of operations of the client device, the host device receiving the communication information when the designated operating portion is designated by a designation member of the communication unit;
- wherein the communication information process determination unit, in the event that the operation indicated by the first communication information and the operation indicated by the second communication information are different, after suspending the process corresponding to the operation indicated by the first communication information, executes the process corresponding to the designation of the operation indicated by the second communication information and, in the event that the operation indicated by the first communication information and the operation indicated by the second communication information are identical, determines a continuation of the process corresponding to the operation indicated by the first communication information.

6. A program stored in a non-transitory computer storage medium for causing execution of an information processing method by a host device that includes a communication unit which is adapted to communicate with a client device, the program comprising:
- instructions for judging whether or not first communication information to be transmitted and received via one round of communication has all been transmitted and received;
- instructions for, in the event that the communication unit is unable to receive the first communication information before it is judged in the communication completion judgment step that the first communication information has all been transmitted and received, determining a process related to the first communication information based on second communication information received via a next or subsequent round of communication;
- instructions for receiving communication information corresponding to a designated operating portion from a plurality of operating portions of the client device, the plurality of operating portions corresponding to a plurality of operations of the client device, the host device receiving the communication information when the designated operating portion is designated by a designation member of the communication unit;
- instructions for, in the event that the operation indicated by the first communication information and the operation indicated by the second communication information are different, after suspending the process corresponding to the operation indicated by the first communication information, executing the process corresponding to the designation of the operation indicated by the second communication information and, in the event that the operation indicated by the first communication information and the operation indicated by the second communication information are identical, determining a continuation of the process corresponding to the operation indicated by the first communication information.

* * * * *